United States Patent
Shumeli et al.

(10) Patent No.: US 7,930,522 B2
(45) Date of Patent: Apr. 19, 2011

(54) METHOD FOR SPECULATIVE EXECUTION OF INSTRUCTIONS AND A DEVICE HAVING SPECULATIVE EXECUTION CAPABILITIES

(75) Inventors: Guy Shumeli, Shoarn (IL); Itzhak Barak, Kadima (IL); Uri Dayan, Herzelia (IL); Amir Paran, Arugot (IL); Idan Rozenberg, Ra'Anana (IL); Doron Schupper, Rehovot (IL)

(73) Assignee: Freescale Semiconductor, Inc., Austin, TX (US)

( * ) Notice: Subject to any disclaimer, the term of this patent is extended or adjusted under 35 U.S.C. 154(b) by 419 days.

(21) Appl. No.: 12/194,279

(22) Filed: Aug. 19, 2008

(65) Prior Publication Data

US 2010/0049954 A1 Feb. 25, 2010

(51) Int. Cl.
*G06F 9/48* (2006.01)
(52) U.S. Cl. ...................................................... 712/220
(58) Field of Classification Search .................. None
See application file for complete search history.

(56) References Cited

U.S. PATENT DOCUMENTS

| | | | |
|---|---|---|---|
| 5,421,020 A * | 5/1995 | Levitan | 712/237 |
| 5,991,874 A * | 11/1999 | Mills et al. | 712/300 |
| 6,016,543 A * | 1/2000 | Suzuki et al. | 712/233 |
| 6,058,473 A | 5/2000 | Guttag et al. | |
| 6,374,346 B1 | 4/2002 | Seshan et al. | |
| 6,513,109 B1 | 1/2003 | Gschwind et al. | |
| 6,931,515 B2 * | 8/2005 | Ross et al. | 712/216 |
| 7,412,591 B2 * | 8/2008 | Ma et al. | 712/229 |
| 7,600,102 B2 * | 10/2009 | Wilson | 712/234 |
| 7,724,261 B2 * | 5/2010 | Thekkath et al. | 345/522 |
| 2004/0039900 A1 * | 2/2004 | Heishi et al. | 712/234 |
| 2005/0125785 A1 * | 6/2005 | Gillies et al. | 717/159 |
| 2006/0288195 A1 | 12/2006 | Ma et al. | |

* cited by examiner

*Primary Examiner* — Eric Coleman (57) ABSTRACT

A method for speculative execution of instructions, the method includes: decoding a compare instruction; speculatively executing, in a continuous manner, conditional instructions that are conditioned by a condition that is related to a resolution of the compare instruction and are decoded during a speculation window that starts at the decoding of the compare instruction and ends when the compare instruction is resolved; and stalling an execution of a non-conditional instruction that is dependent upon an outcome of at least one of the conditional instructions, until the speculation window ends.

20 Claims, 5 Drawing Sheets

METHOD FOR SPECULATIVE EXECUTION OF INSTRUCTIONS AND A DEVICE HAVING SPECULATIVE EXECUTION CAPABILITIES

FIELD OF THE INVENTION

The present invention relates to a method for speculative execution of instructions and a device having speculative execution capabilities.

BACKGROUND OF THE INVENTION

In long pipelined Digital Signal Processing (DSP) processors, load-store and pointer-arithmetic operations are executed by address modules and especially by pipeline stages of address module that precede the execution stage of a data module that includes an arithmetic-logic-unit (ALU).

If a load-store operation depends on an ALU-product (for example—depends upon a condition that is represented by a predicator-bit, such as a result of a compare operation), many stalls might be inserted in order to delay the execution of the load-store and pointer-arithmetic operations till after the ALU-product is provided. In many cases multiple load-store and pointer-arithmetic instructions are conditioned by a result of an ALU operation.

For example, the SC3400 DSP processor of Freescale of Austin Tex., USA inserts five stall cycles between an ALU-compare instruction to a conditional memory access. In the example below, five stall cycles are inserted between instructions I1 and I2:

I1 cmp d1,d2 {compare the values of data registers d1 and d2}
I2 iff adda r2,r3 {if d1 differs from d2 then sum the values of address registers r2 and r3 and store the result at r3}
I3 ift move r3, ($1000) {if d1 equals to d2 then move address register r3, to the memory at address $1000}

SUMMARY OF THE PRESENT INVENTION

The present invention provides a method and a system as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

It has been shown that the throughput of a processor can be increased by propagating conditional load-store and pointer-arithmetic instructions in a continuous manner (without stalls) and ignoring or utilizing the results of these conditional instructions once a condition associated with these instructions is resolved. A stall can be introduced when detecting that an unconditional instruction is responsive to a result of a conditional instruction. For example, if an unconditional read instruction reads the content of a certain address register that was written by an unresolved conditional write instruction then the unconditional read instruction will wait till the condition is resolved.

Once a compare instruction is decoded a speculation window is opened. The speculation window ends when the compare instruction is resolved. Conditional load-store and pointer-arithmetic operations can be marked as speculative and propagate through the pipeline stages of a processor without stalls and may be cancelled (ignored of) or be taken into account when the ALU-compare is resolved. No stalls are needed even when a register is conditionally read after it was conditionally written.

During the speculation window multiple conditional instructions can be received. For example, a conditional read instruction can be decoded after a conditional write instruction. The execution of the conditional read instruction can depend upon the relationships between the condition of the conditional read instruction and the conditional write instruction. If the conditions are the same the conditional read instruction can read the result of the conditional write instruction. If the conditions are opposite to each other (one is conditioned by a success of the comparison while the other is conditioned by the failure of the comparison) then the conditional read will read a value that preceded the conditional write instruction.

A content of a register can be updated only after the speculation window ends but a result of a conditional write to the register can propagate through a pipeline. This result can be read as a result of a conditional read instruction that follows the conditional write instruction.

The execution of the following code will not require to insert stall cycles:

| I1 | CMP D1,D2 | {compare D1, D2} |
| I2 | IFT ADDA R2,R3 | {If D1=D2 then R3 = R2+R3} |
| I3 | IFT ADDA R3,R4 | {If D1=D2 then R4 = R3+R4} |

Because both pointer arithmetic instructions I2 and I3 are conditioned by a success of the comparison (D1=D2) then I3 can be executed without any stall and the result of I2 can propagate through the pipeline and be further used when instruction I3 is executed. This propagation is also referred to as a forwarding of R3. The actual update (if D1 turns to be equal to D2) of registers R2, R3 and R4 occurs after I1 is resolved.

The execution of the following code will not require to insert stall cycles:

| I1 | CMP D1,D2 | {compare D1, D2} |
|---|---|---|
| I2 | IFT ADDA R2,R3 | {If D1=D2 then R3 = R2+R3} |
| I3 | IFF ADDA R3,R4 | {If D1 differs from D2 then R4 = R3+R4} |

Because both pointer arithmetic instructions I2 and I3 are conditioned by opposing conditions (I2 is conditioned by the success of I1 while I3 is conditioned by a failure of I1) then although I3 can be executed without any stall it ignores the outcome of I2 and uses the old value of register R3—in this case the content of R2 is not forwarded. The actual update of either one of registers R3 and R4 occurs after I1 is resolved.

Status information can be updated during the speculation window. It can indicate which registers are associated with a conditional instruction. Additionally or alternatively, the status information can indicate which registers are associated with unconditional instructions that depend upon an outcome of a conditional instruction.

Figure 1:
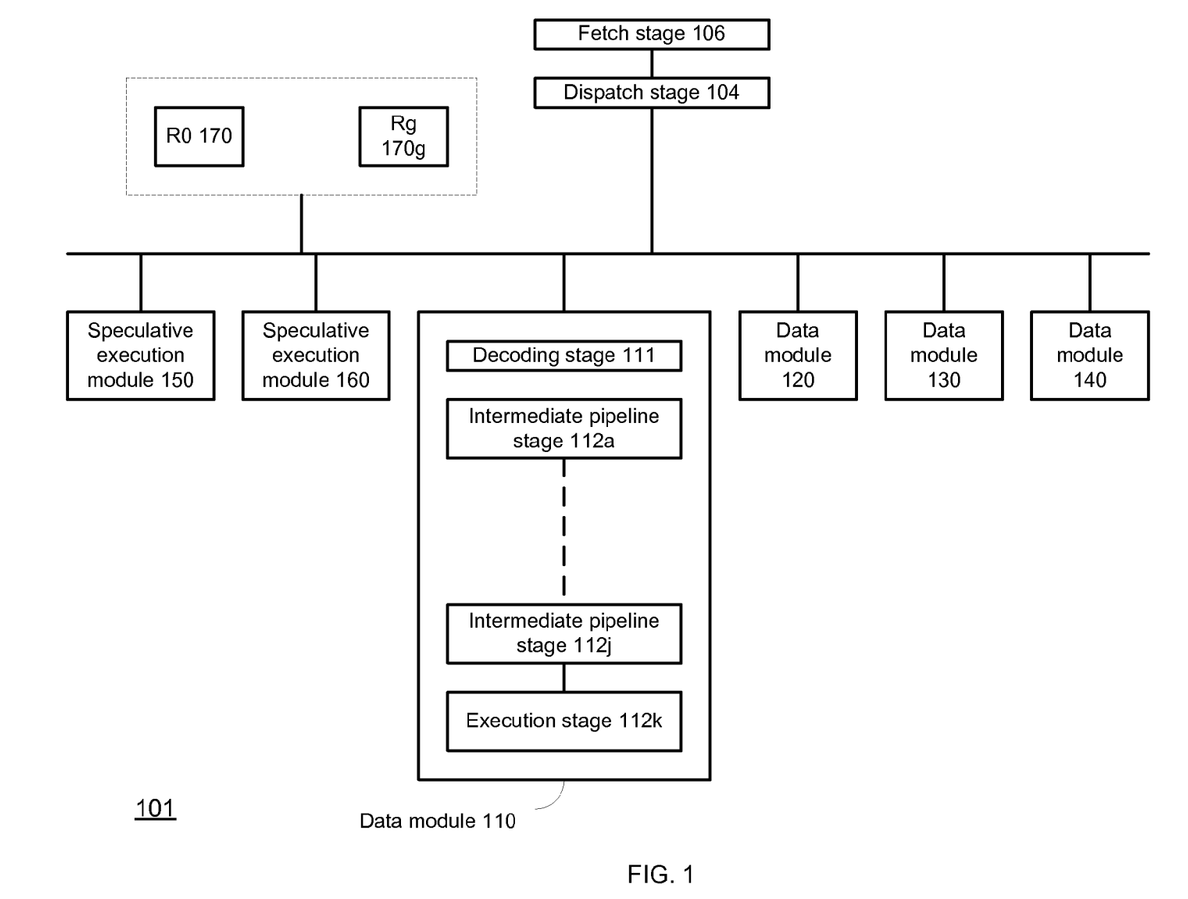
FIG. 1 schematically shows an example of an embodiment of a system.
Figure 2:
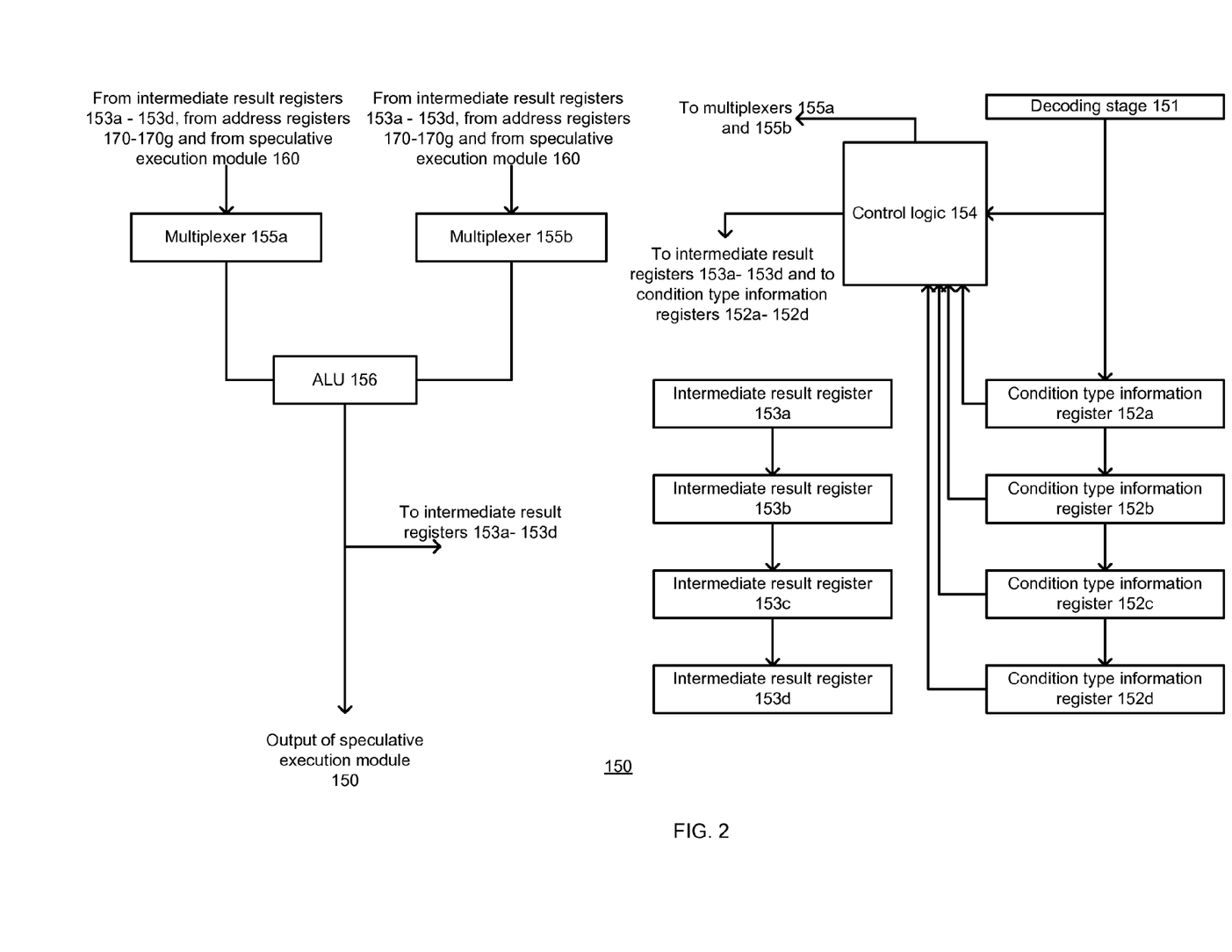
FIG. 2 schematically shows an example of an embodiment of a speculative execution module.

FIG. 1 schematically shows an example of an embodiment of system 100. System 100 includes a processor 101 that can execute a very long instruction word (VLIW) that includes two address instructions and four data instructions. FIG. 2 schematically shows an example of an embodiment of a speculative execution module 150.

Processor 101 includes fetch stage 106, dispatch stage 104 and six modules—four data modules 110, 120, 130 and 140 and two address modules 150 and 160. For simplicity of explanation only data module 110 and address module 150 are illustrated in greater details.

Data module 110 includes a pipeline sequence that includes decoding stage 111 and other K pipeline stages 112a-112k that follow decoding stage 111. Pipeline stage (also referred to as execution stage) 112k can resolve a condition—it can include an arithmetic logic unit that can, for example, provide a comparison result and set (or reset) an appropriate flag that indicates whether a condition associated with the comparison result was fulfilled. It is noted that execution stage 112k can be followed by write back stage.

After being decoded by decoding stage 111 the compare instructions should propagate through K pipeline stages 112a-112k and accordingly—the speculation window is K pipeline cycles long. A pipeline stage (out of pipeline stages 112a-112k) is expected to process an instruction during a single pipeline cycle. Pipeline stages 112a-112j (stage 112j is followed by stage 112k) can be referred to as intermediate pipeline stages because they are located between decoding stage 111 and execution stage 112k.

A speculation window indication can be sent from data module 110 to speculative execution module 150 once decoder stage 111 decodes a compare instruction. A counter (not shown) of device 100 can count down K execution cycles to determine that the speculation window ends.

Speculative execution module 150 can speculatively execute, in a continuous manner, conditional instructions that are conditioned by a condition that is related to a resolution of a compare instruction (that is being executed by a data module out of data modules 110, 120, 130 and 140) and are decoded during a speculation window that starts at the decoding of the compare instruction and ends when the compare instruction is resolved. Speculative execution module can also stall an execution of a non-conditional instruction that is dependent upon an outcome of at least one of the conditional instructions, until the speculation window ends.

Speculative execution module 150 includes decoding stage 151, multiple condition type information registers 152a-152d, multiple intermediate result registers 153a-153d, control unit 154, multiplexers 155a and 155b, arithmetic logic unit (ALU) 156, and can be connected to address registers R0-Rg 170-170g.

Decoding stage 151 can decode instructions such as load store instructions or pointer arithmetic instructions. Each instruction includes condition type information that indicates whether the instruction is a conditional instruction or not—and if it is a conditional instruction—what is the type of the condition (true or false). The condition type information propagates through condition type information registers 152a-152d.

Multiple intermediate result registers 153a-153d store the results of load store instructions or pointer arithmetic instructions. These results propagate through intermediate result registers 153a-153d.

Control unit 154 controls the propagation of results through intermediate result registers 153a-153d, controls the propagation of condition type information via condition type information registers 152a-152d, and controls which information is being outputted from each multiplexer out of multiplexers 155a and 155b. Control logic 154 can also update status registers that store status information.

Control unit 154 can stall the propagation of results and condition type information when it receives an indication that speculative execution module 150 decoded an unconditional instruction that is dependent upon a result of an unresolved conditional instruction.

Control unit 154 can also determine whether to output a result from speculative execution module 150 or to erase it, in response to a resolution of the compare instruction.

It is noted that each multiplexer out of multiplexer 155a and 155b can include additional inputs that enable a reception of information from intermediate result registers of another speculative execution module, such as from speculative execution module 160. This is illustrated by an arrow titled "from speculative execution module 160" that is connected to multiplexer 155a and 155b.

Speculative execution module 160 includes the same components as speculative execution module 150 although both speculative modules can share the same status register 154c.

Figure 3:
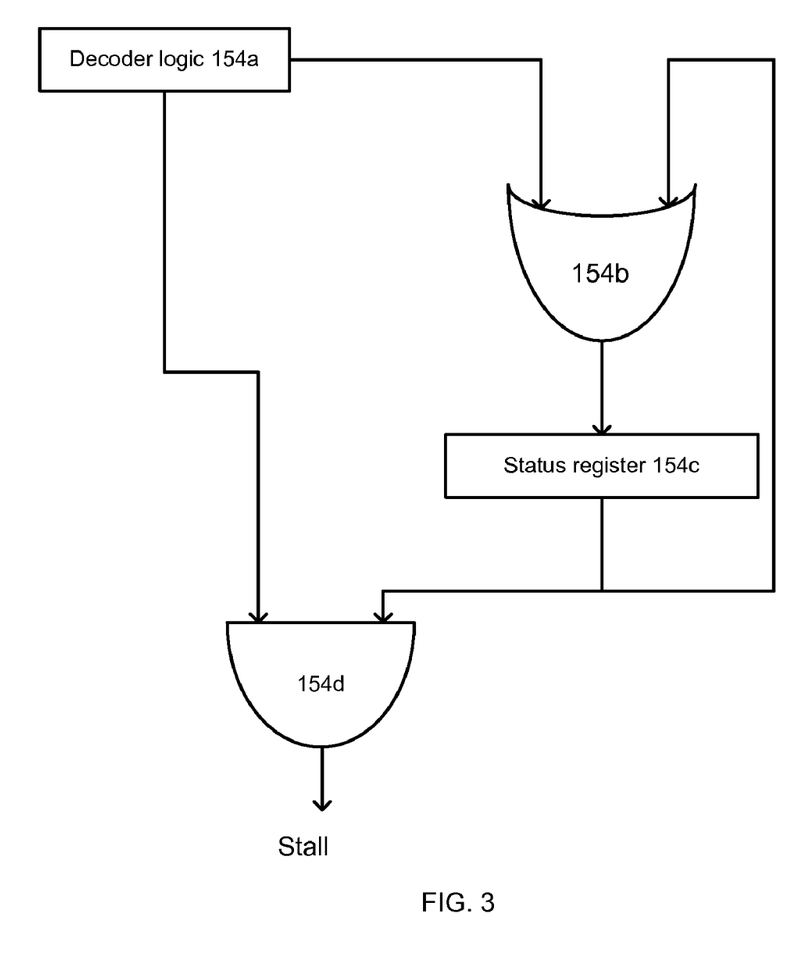
FIG. 3 schematically shows an example of an embodiment of a portion of a control unit.

FIG. 3 schematically shows an example of an embodiment of a portion of control unit 154. It includes decoder logic 154a, OR gate 154b, status register 154c, and AND gate 154d.

Status register 154c includes a status bit per each register 170-170g that indicates whether the register can be written by a conditional instruction. OR gate 154b is connected to the output of status register 154c and to decoder logic 154a in order to update the content of status register 154c whenever a new register is written by a conditional instruction.

Decoder logic 154a determines which address register is written by a conditional instruction and which address register can be read by a non-conditional instruction.

If decoder logic 154a determines that a certain address register is written by a conditional instruction than decode logic 154a sends an appropriate signal to OR gate 154b such as to set an appropriate status bit. OR gate 154*b* allows to update the content of status register 154*c*

AND gate 154*c* performs a bit wise AND operation to determine if there is a register that is written by a conditional instruction and is also read by a unconditional instruction. If such a register exists then a stall control signal should be issued.

Referring back to FIG. 2, the inputs of each multiplexer out of multiplexers 155*a* and 155*b* are connected to each address register out of address registers R0-Rg 170-170*g* and to each intermediate result register out of intermediate result registers 153*a*-153*d*. The output of multiplexer 155*a* is connected to a first input of ALU 156 and the output of multiplexer 155*b* is connected to a second input of ALU 156. The output of ALU 156 can be connected to each of the intermediate result registers.

Condition type information registers 152*a*-152*d* assist control logic 154 in determining whether to retrieve an old value of an address register or whether to retrieve a new value that is currently stored in intermediate result register out of intermediate result registers 153*a*-153*d*.

Figure 4:
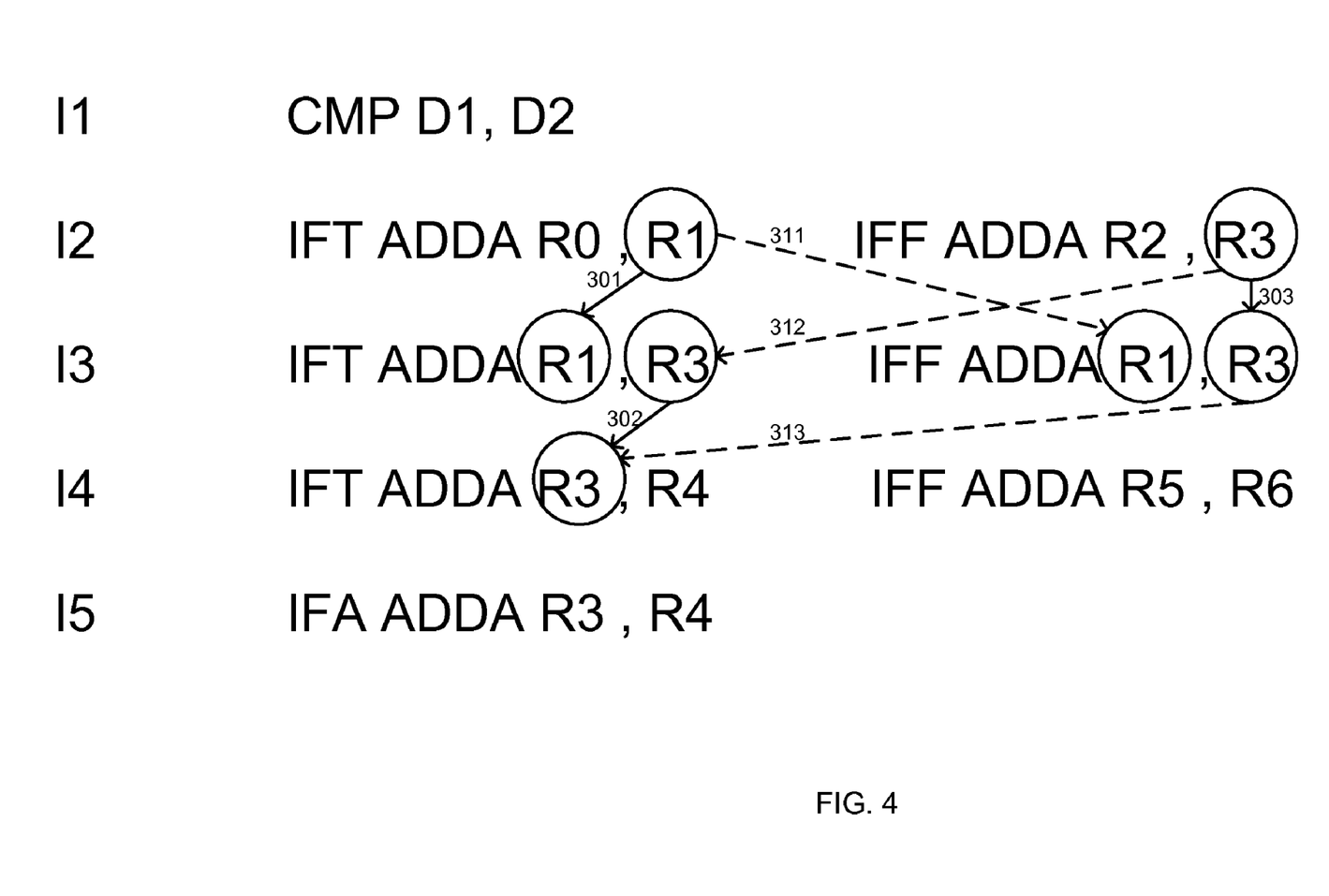
FIG. 4 schematically shows an example of a code.

The functionality of some of the mentioned above components will be further illustrated by the following code and FIG. 4.

The code includes the following instructions:

| I1 | CMP D1, D2 | |
|----|------------|------------|
| I2 | IFT ADDA R0,R1 | IFF ADDA R2,R3 |
| I3 | IFT ADDA R1,R3 | IFF ADDA R1,R3 |
| I4 | IFT ADDA R3,R4 | IFF ADDA R5,R6 |
| I5 | IFA ADDA R3,R4 | |

Execution of instruction I1

CMP D1, D2 will be executed by data module 110, the "if true" conditional address add instructions (IFT ADDA) are executed by speculative execution module 150 and the "if false" conditional address add instructions (IFF ADDA) are executed by speculative execution module 160. It is assumed that speculative execution module 160 can access address registers R1-Rg 170-170*g*, and has intermediate result registers 163*a*-163*d*.

Execution of instruction I2.

IFT ADDA R0,R1 is executed by speculative execution module 150. Multiplexer 155*a* provides the content of R0 to ALU 156 while multiplexer 155*b* provides the content of R1 to ALU 156. The output of ALU 156 (the new value of R1) is sent to intermediate result registers 153*a*. Condition type information register 152*a* indicates that the condition type is "T". The second bit of status register 154*c* is set to indicate that register R1 170 is written by a conditional instruction.

IFF ADDA R2,R3 is executed by speculative execution module 160. Multiplexer 165*a* provides the content of R2 to ALU 166 while multiplexer 165*b* provides the content of R3 to ALU 166. The output of ALU 166 (the new value of R3) is sent to intermediate result registers 163*a*. Condition type information register 162*a* indicates that the condition type is "F". The forth bit of status register 154*c* is set to indicate that register R3 158*c* is written by a conditional instruction.

Execution of Instruction I3

IFT ADDA R1,R3 is executed by speculative execution module 150. Because the condition (T) associated with IFT ADDA R1, R3 is the same as the condition (T) associated with IFT ADDA R0,R1 then the "new" value of R1 (now stored in intermediate result register 153*b*) is provided to ALU 156. This is illustrated by arrow 301. Because the condition (T) associated with IFT ADDA R1, R3 differs from the condition (F) associated with IFF ADDA R2,R3 then the "new" value of R3 is ignored and the content of R3 is taken from register R3 170*c*. This is illustrated by dashed arrow 312. The forth bit of status register 154*c* is set to indicate that register R3 170*c* is written by a conditional instruction.

IFF ADDA R1,R3 is executed by speculative execution module 160. Because the condition (F) associated with IFF ADDA R1, R3 is the same as the condition (F) associated with IFF ADDA R2, R3 then the "new" value of R3 (now stored in intermediate result register 163*b*) is provided to ALU 166. This is illustrated by arrow 303. Because the condition (F) associated with IFF ADDA R1, R3 differs from the condition (T) associated with IFT ADDA R0,R1 then the "new" value of R1 is ignored and the content of R1 is taken from register R1 170*a*. This is illustrated by dashed arrow 311.

Execution of Instruction I4

IFT ADDA R3,R4 is executed by speculative execution module 150. Because the condition (T) associated with IFT ADDA R3, R4 is the same as the condition (T) associated with IFT ADDA R1,R3 then the "new" value of R3 (now stored in intermediate result register 153*b*) is provided to ALU 156. This is illustrated by arrow 302. Because the condition (T) associated with IFT ADDA R3, R4 differs from the condition (F) associated with IFF ADDA R1,R3 then the "new" value of R3 as calculated by speculative execution module 160 is ignored—as illustrated by dashed arrow 313. The fifth bit of status register 154*d* is set to indicate that register R4 170*d* is written by a conditional instruction.

IFF ADDA R5,R6 is executed by speculative execution module 160. It involves fetching information from registers R5 and R6 that were not affected from instructions I1-I3 so that the content of these registers can be read from these registers. The seventh bit of status register 154*c* is set to indicate that register R6 170*f* can be written by a conditional instruction.

Execution of Instruction I5

The execution of unconditional instruction IFA ADDA R3, R4 depends upon the outcome of instructions I2, I3 and I4 and upon the outcome of CMP D1, D2. Speculative execution module 150 stalls the execution of this instruction until data module 110 will resolve CMP D1, D2.

Figure 5:
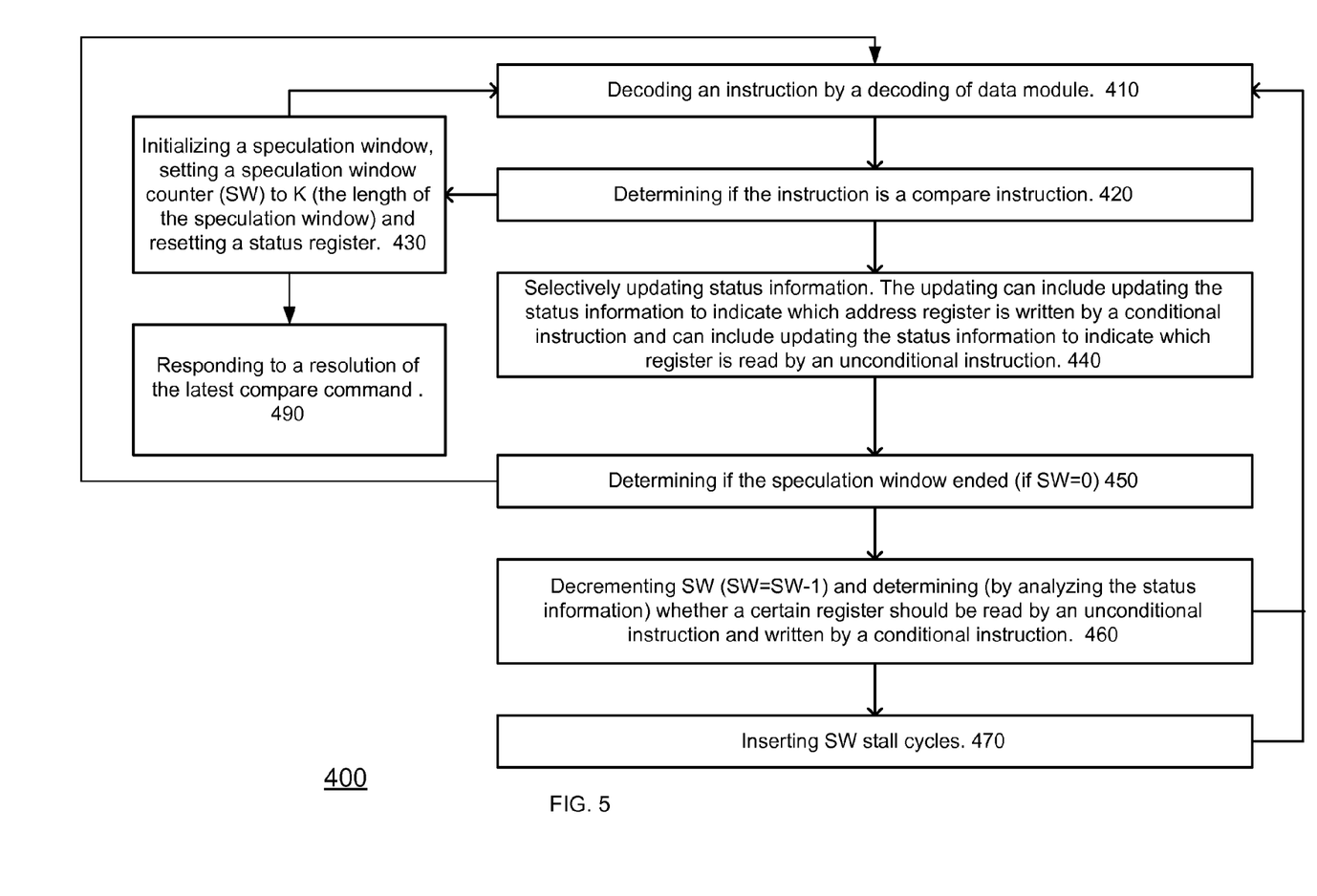
FIG. 5 schematically shows an example of an embodiment of a method.

FIG. 5 schematically shows an example of an embodiment of method 400.

Method 400 starts by stage 410 of decoding an instruction by a decoding stage of data module.

Stage 410 is followed by stage 420 of determining if the instruction is a compare instruction.

If the answer is positive, stage 420 is followed by stage 430 of initializing a speculation window, setting a speculation window counter (SW) to K (the length of the speculation window) and resetting a status register 154*c*. Stage 430 is followed by stages 410 and 490. Stage 490 includes resolving the compare instruction and ignoring or utilizing results of conditional instructions executed during the speculation window. It can include resolving the compare instruction (after K cycles) and ignoring or utilizing results of conditional instructions executed during the speculation window.

If the answer is negative, stage 420 is followed by stage 440 of selectively updating status information. The updating can include updating the status information to indicate which address register is written by a conditional instruction and can include updating the status information to indicate which register is read by an unconditional instruction.

Stage 440 is followed by stage 450 of determining if the speculation window ended (if SW=0).

If the answer is positive then stage 450 can be followed by stage 410.

If the answer is negative stage 440 can be followed by stage 460 of decrementing SW (SW=SW−1) and determining (by analyzing the status information) whether a certain register should be read by an unconditional instruction and written by a conditional instruction. If such a register exists, then stage 460 is followed by stage 470 of inserting SW stall cycles. Else, stage 460 is followed by stage 410.

The execution of method 400 can result in speculatively executing, in a continuous manner (without stall cycles) conditional instructions that are conditioned by a condition that is related to a resolution of the compare instruction and are decoded during a speculation window that starts at the decoding of the compare instruction and ends when the compare instruction is resolved. This can occur during one or more iterations of a sequence of stages that starts by stage 410 and ends by stage 470 (that is followed by stage 410).

The execution of method 400 can also result in stalling an execution of a non-conditional instruction that is dependent upon an outcome of at least one of the conditional instructions, until the speculation window ends. This can occur during an execution of a sequence of stages that starts by stage 410 and ends by stage 470.

Stage 490 can include ignoring an outcome of an execution of at least one conditional instruction if the resolution of the compare instruction indicates that a condition associated with the at least one conditional instruction was not fulfilled.

Multiple iterations of stages 410, 420, 440, 440, 450, 460 and even 470 can result in executing a conditional instruction that depends upon an outcome of another conditional instruction that is decoded during the speculation window.

Multiple iterations of method 400 can result in executing a first conditional instruction that replaces an old value of a certain register by a new value; and executing a second conditional instruction that uses the new value of the register if the first and second conditional instructions have the same dependency on the resolution of the compare instruction. This is illustrated by arrows 301, 302 and 303 of FIG. 3.

Multiple iterations of method 400 can result in executing a first conditional instruction that replaces an old value of a certain register by a new value; and executing a second conditional instruction that uses the old value of the register if the first and second conditional instructions have opposing dependencies on the resolution of the compare instruction. This is illustrated by arrows 311, 312 and 313 of FIG. 4.

Multiple iterations of method 400 can include executing, in parallel, conditional instructions that have opposing dependencies on the resolution of the compare instruction and selecting, in response to a resolution of the compare instruction, an outcome of one conditional instruction out of the conditional instructions. This is illustrated by FIG. 4 as well as by speculative execution modules 150 and 160 that can operate in parallel and can exchange information between them.

Method 400 can include forwarding values of registers affected by the conditional instructions during the speculation window. This is illustrated by arrows 301, 302 and 303 of FIG. 4.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for speculative execution of instructions, the method comprising: decoding a compare instruction; speculatively executing, in a continuous manner, conditional instructions that are conditioned by a condition that is related to a resolution of the compare instruction and are decoded during a speculation window that starts at the decoding of the compare instruction and ends when the compare instruction is resolved; and stalling an execution of a non-conditional instruction that is dependent upon an outcome of at least one of the conditional instructions, until the speculation window ends.

2. The method according to claim 1 comprising ignoring an outcome of an execution of at least one conditional instruction if the resolution of the compare instruction indicates that a condition associated with the at least one conditional instruction was not fulfilled.

3. The method according to claim 1 wherein the speculatively executing comprises executing a conditional instruction that depends upon an outcome of another conditional instruction that is decoded during the speculation window.

4. The method according to claim 1 wherein the speculatively executing comprises:
executing a first conditional instruction that replaces an old value of a certain register by a new value; and
executing a second conditional instruction that uses the new value of the register if the first and second conditional instructions have the same dependency on the resolution of the compare instruction.

5. The method according to claim 1 wherein the speculatively execution comprises:
executing a first conditional instruction that replaces an old value of a certain register by a new value; and
executing a second conditional instruction that uses the old value of the register if the first and second conditional instructions have opposing dependencies on the resolution of the compare instruction.

6. The method according to claim 1 comprising executing, in parallel, conditional instructions that have opposing dependencies on the resolution of the compare instruction and selecting, in response to a resolution of the compare instruction, an outcome of one conditional instruction out of the conditional instructions.

7. The method according to claim 1 comprising updating status data that indicates which registers are affected by the non-conditional instructions and indicates registers are affected by the conditional instructions.

8. The method according to claim 1 wherein the speculatively executing comprises forwarding values of registers affected by the conditional instructions during the speculation window.

9. The method according to claim 1 wherein the conditional instructions are part of very long instruction words.

10. The method according to claim 1 wherein the conditional instructions are selected from a group consisting of load store instructions and pointer arithmetic instructions.

11. A device having speculative execution capabilities, the device comprises:
a first sequence of pipelined stages that is configured to execute a compare instruction; wherein the pipelined stages comprises a decoding stage, multiple intermediate pipeline stages and an execution stage;
a speculative execution module that is configured to:
speculatively execute, in a continuous manner, conditional instructions that are conditioned by a condition that is related to a resolution of the compare instruction and are decoded during a speculation window that starts at the decoding of the compare instruction and ends when the compare instruction is resolved; and
stall an execution of a non-conditional instruction that is dependent upon an outcome of at least one of the conditional instructions, until the speculation window ends.

12. The device according to claim 11 comprising wherein the device ignores an outcome of an execution of at least one conditional instruction if the resolution of the compare instruction indicates that a condition associated with the at least one conditional instruction was not fulfilled.

13. The device according to claim 11 wherein the speculative execution module is configured to executing a conditional instruction that depends upon an outcome of another conditional instruction that is decoded during the speculation window.

14. The device according to claim 11 wherein speculative execution module is configured to:
execute a first conditional instruction that replaces an old value of a certain register by a new value; and
execute a second conditional instruction that uses the new value of the register if the first and second conditional instructions have the same dependency on the resolution of the compare instruction.

15. The device according to claim 11 wherein the speculative execution module is configured to:
execute a first conditional instruction that replaces an old value of a certain register by a new value; and
execute a second conditional instruction that uses the old value of the register if the first and second conditional instructions have opposing dependencies on the resolution of the compare instruction.

16. The device according to claim 11 comprising multiple speculative execution modules that are configured to execute, in parallel, conditional instructions that have opposing dependencies on the resolution of the compare instruction; and
wherein the device is configured to select, in response to a resolution of the compare instruction, an outcome of one conditional instruction out of the conditional instructions.

17. The device according to claim 11 wherein the speculative execution module is configured to update status data that indicates which registers are affected by the non-conditional instructions and indicates registers that are affected by the conditional instructions.

18. The device according to claim 11 wherein the speculative execution module is configured to forward values of registers affected by the conditional instructions during the speculation window.

19. The device according to claim 11 wherein the device comprises multiple sequences of pipelined stages and at least one speculative execution module for executing very long instruction words.

20. The device according to claim 11 wherein the conditional instructions are selected from a group consisting of load store instructions and pointer arithmetic instructions.

* * * * *